Jan. 26, 1965 M. LAPIDUS Re. 25,717

MACHINE FOR MAKING SLABS

Original Filed Feb. 11, 1959 5 Sheets-Sheet 1

*INVENTOR.*

MORRIS LAPIDUS

MACHINE FOR MAKING SLABS

Original Filed Feb. 11, 1959 5 Sheets-Sheet 2

INVENTOR.
MORRIS LAPIDUS

MACHINE FOR MAKING SLABS

Original Filed Feb. 11, 1959 5 Sheets-Sheet 3

INVENTOR.

MORRIS LAPIDUS

MACHINE FOR MAKING SLABS

Original Filed Feb. 11, 1959 5 Sheets-Sheet 4

INVENTOR.
MORRIS LAPIDUS

MACHINE FOR MAKING SLABS

Original Filed Feb. 11, 1959 5 Sheets-Sheet 5

*INVENTOR.*

MORRIS LAPIDUS

United States Patent Office

Re. 25,717
Reissued Jan. 26, 1965

25,717
MACHINE FOR MAKING SLABS

Morris Lapidus, 9031 Fort Hamilton Parkway, Brooklyn 9, N.Y.

Original No. 3,060,540, dated Oct. 30, 1962, Ser. No. 792,667, Feb. 11, 1959. Application for reissue Aug. 26, 1963, Ser. No. 304,708
8 Claims. (Cl. 25—99)

Matter enclosed in heavy brackets [ ] appears in the original patent but forms no part of this reissue specification; matter printed in italics indicates the additions made by reissue.

This invention relates to a machine for the rapid production of reinforced *and unreinforced* slabs, beams, columns or the like, made from cementitious material.

The principle object of this machine is to produce slabs of the character described in my patent applications, Serial No. 565,565, filed Feb. 15, 1956, now abandoned; Serial No. 577,499, filed April 11, 1956, now abandoned; and Serial No. 653,598, filed April 18, 1957, now abandoned; and longitudinally cored slabs or the like.

These are elongated slabs having *corings or* ducts extending transversely through them in a horizontal plane spaced from the horizontal plane of *corings,* ducts or large grooves extending longitudinally through the slabs, the slabs being viewed as they are positioned in a floor structure.

Another object is to produce slabs with small grooves in the longitudinal side faces thereof extending for part of or the full length of the slabs.

Another object is to produce slabs, beams, columns, or the like of various lengths.

Another object is to provide support for the reinforcing cage of the slab during the process of manufacture.

Another object is to provide support against deflection for the cores employed to produce the *corings or* ducts extending longitudinally through the slabs.

Another object is to provide means for *withdrawing* [beginning the] [withdrawal of] the longitudinally extending cores from the mold [after only a small portion of the mold had been filled by] *as* a cementitious material depositing mechanism *passes* [passing slowly thereover] *lengthwise over the mold to fill the mold with material,* [and to continue the withdrawal at substantially the same rate of speed as the speed of the mechanism,] *the free ends of the cores following behind the filling of the mold,* in order to prevent rupture of the uncured concrete of the slab, to save time in the manufacturing process, to save power in pulling the cores, to prevent abrasive wear on the cores, except for the ends thereof, and to form corings having the same vertical section throughout their length.

Another object is to produce the slabs with one pass of the mechanism over the mold.

Another object is to provide means for shutting off the flow of cementitious material from the hopper portion of the mechanism after it has passed over the mold.

Other objects of the invention will become apparent by reference to the following detailed description taken in connection with the accompanying drawings in which.

Like reference characters refer to corresponding parts throughout the several views.

Figure 1:
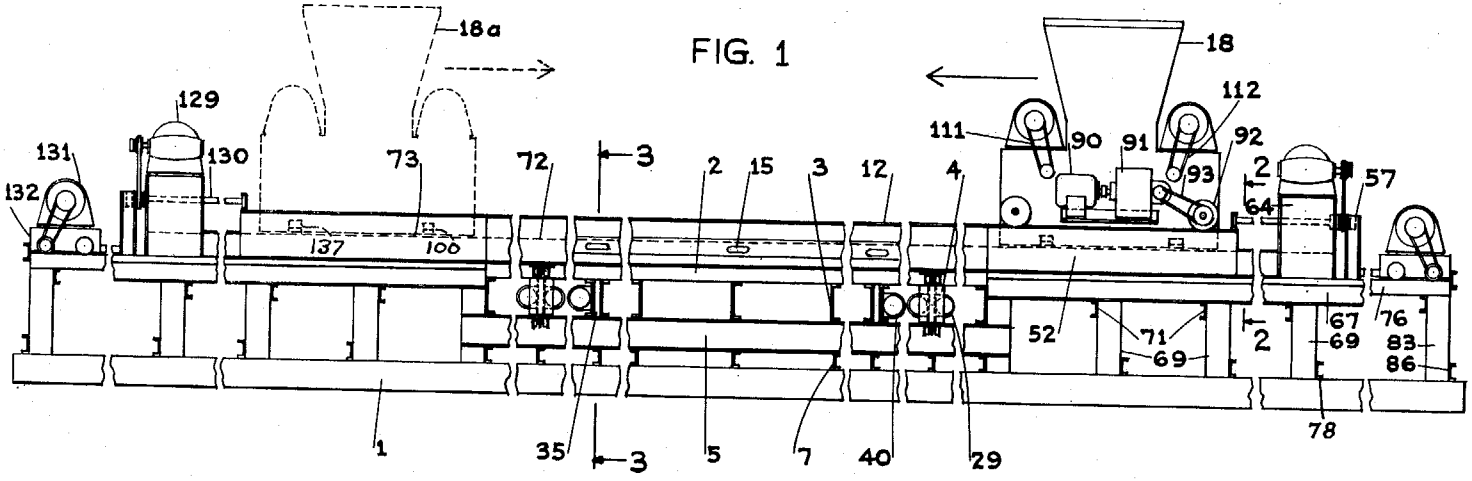
FIG. 1 is a broken front side elevation of the complete machine.
Figure 3:
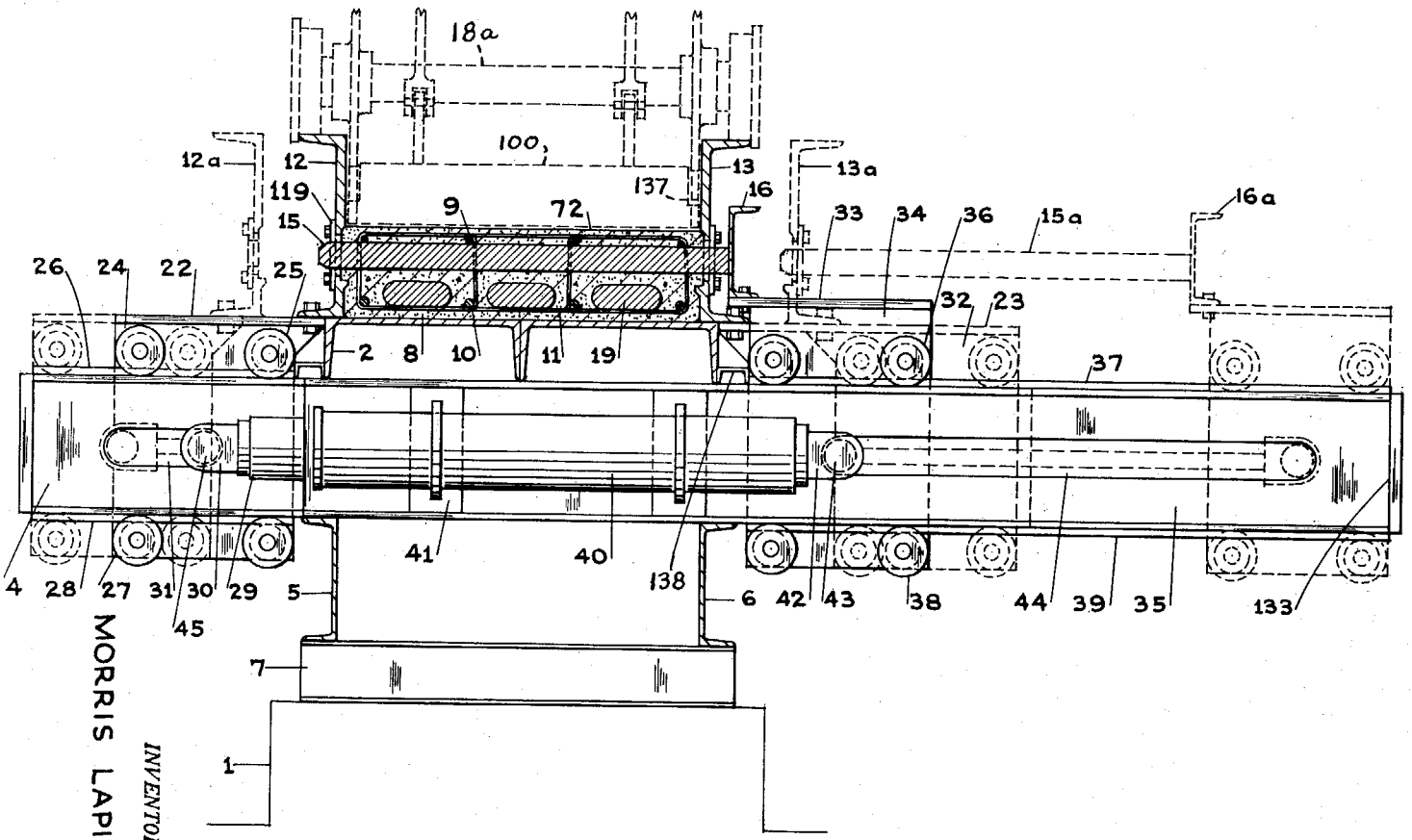
FIG. 3 is a transverse vertical sectional view taken on the line 3—3 of the FIG. 1.

As shown in FIG. 1, the entire machine rests on base 1. [A slab is produced by] *One way of positioning the pallet and reinforcing cage in the machine includes* placing pallet 2, *which may comprise* [comprising] two welded channels, *as shown in the drawings,* on top of transversely extending and horizontally disposed pallet supports 3 and spaced apart pairs of pallet supports 4 and 35. As shown in FIG. 3, 138 are stops attached to the tops of members 3, 4 and 35 to help properly locate pallet 2 in the machine. The pallet supports are, in turn, supported by two longitudinally extending and horizontally disposed members, 5 at the front of the machine and 6 at the rear, which are in turn, supported by transversely extending and horizontally disposed members 7 which rest directly on base 1.

Figure 4:
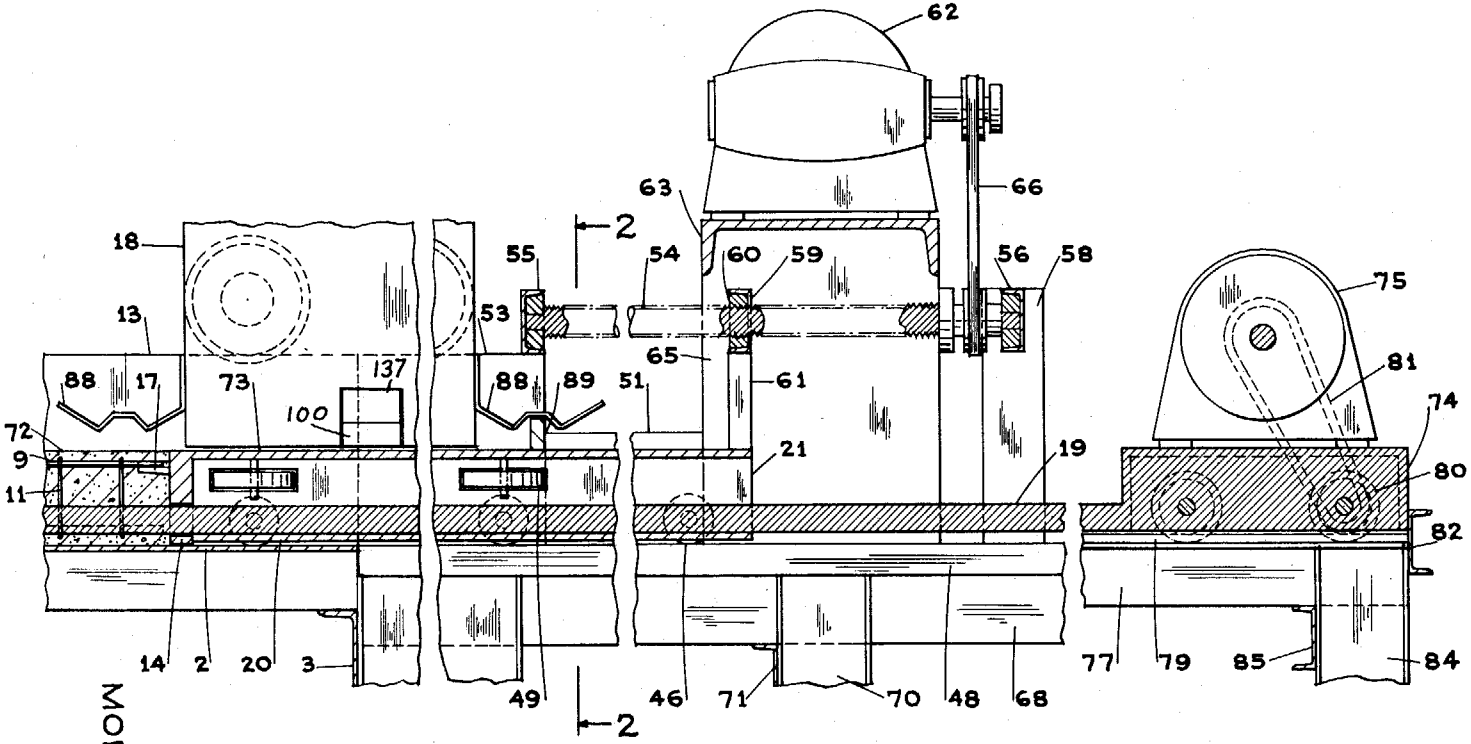
FIG. 4 is a composite and broken longitudinal vertical sectional view of the right end of the machine, the left end of the machine being identical, except reversed.

A reinforcing cage 8, comprising upper and lower longitudinally extending reinforcing rods 9 and 10, respectively, joined by stirrups 11, is temporarily suspended about one inch above pallet 2 while oppositely spaced mold side members, 12 at the front of the machine and 13 at the rear, each as long as the pallet, as shown in FIG. 1, and transversely extending cores 15 attached to member 16 are moved from their inoperative positions 12a, 13a, 15a and 16a, shown with dash lines, to their operative positions, as shown in FIG. 3, almost simultaneously with prior movement of mold end member 14 from an inoperative position outwardly from the right end of the pallet to an operative position on top of the pallet, as shown in FIG. 4, and the simultaneous movement of a corresponding oppositely spaced mold end member 14 from an inoperative position outwardly from the left end of the pallet, not shown on any of the drawings, to an operative position on top of the pallet.

Figure 5:
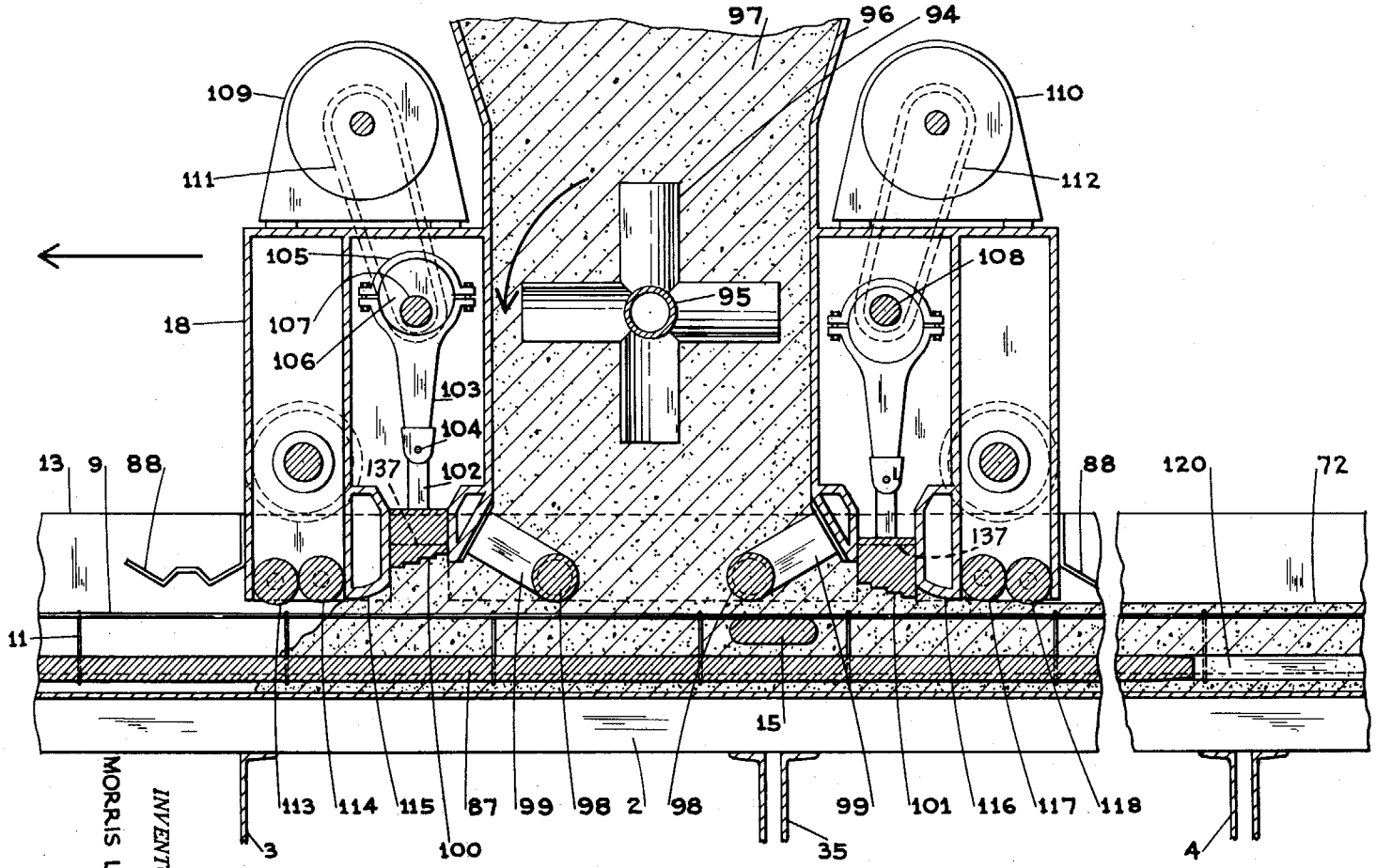
FIG. 5 is a longitudinal vertical sectional view of the cementitious material depositing mechanism in operation over the mold.

Reinforcing cage 8 is then released from suspension whereby the upper longitudinally extending reinforcing rods 9 rest on and are supported at several points along the length thereof by the transversely extending cores 15, one of which is shown in FIG. 5, the upper reinforcing rods being supported at the ends thereof on brackets 17 permanently attached to mold end members 14, as shown in FIG. 4. One of the transverse cores 15 is preferably positioned at the center of the cage, as shown in FIG. 1, for best support of the reinforcing cage against deflection, the other cores 15 being positioned between the center and the ends at regular intervals. However, all the transverse cores could be concentrated at the center of the cage.

As shown in FIG. 3, the means provided for moving mold side members 12 and 13 to operative and inoperative positions thereof [consist of] *includes* horizontal plates 22 to which mold side member 12 is attached and horizontal plates 23 to which mold side member 13, opposite thereto, is attached. Plates 22 are also attached to vertically disposed plates 24, each positioned between a pair of spaced pallet supports 4 and having four wheels 25 mounted on rods attached to the upper part of the plate 24, the wheels riding on rails 26 attached to the top flanges of the spaced pallet supports, and four wheels 27 mounted on rods attached to the lower part of plate 24 and riding on rails 28 attached to the bottom flanges of the pallet supports 4. At least two such vertically disposed plates 24, with wheels 25 and 27 attached thereto, are in widely spaced positions in the machine.

A horizontally disposed air cylinder 29, employed in at least two positions in the machine and attached to one of the pair of pallet supports 4, is provided with a piston head 30. An elongated opening 31 in the web of the pallet support permits a transversely extending rod 45 to be attached at one end thereof to the piston head 30 and at the opposite end thereof to plate 24 for reciprocal movement of the plate whereby the mold side member 12 is moved to operative position thereof on top of the pallet and to inoperative position thereof beyond the side of the pallet, as designated by 12 and 12a, respectively.

An identical arrangement at the rear of the machine is employed for reciprocal movement of a vertically disposed plate 32 whereby mold side member 13 is simultaneously moved to operative and inoperative positions thereof, as designated by 13 and 13a, respectively, there being two such plates 32 attached to two plates 23 [,] which are, in turn, attached to member 13 at widely separated points.

The transversely extending cores 15, attached to member 16, are moved to operative and inoperative positions thereof, as designated by 16 and 16a, respectively, in the same manner as for the mold side members. Member 16 is attached to horizontal plates 33 which, in turn, are attached to vertically extending plates 34, each positioned between a pair of pallet supports 35 extending rearward of the machine, at least two pairs being employed at widely spaced intervals, plate 34 having transversely extending rods therethrough at the upper part thereof on which are mounted four wheels 36 riding on rails 37 attached to the top flanges of pallet supports 35, and four wheels 38 correspondingly mounted at the lower part of vertically extending plate 34 riding on rails 29 attached to the bottom flanges of pallet supports 35.

As shown in FIGS. 1 and 3, a horizontally disposed air cylinder 40 is attached to one of the pair of pallet supports 35 by means of brackets 41, whereby to provide power for reciprocal movement of transversely extending cores 15 to operative and inoperative positions thereof by means of the attachment of piston head 42 of the air cylinder to vertically disposed plate 34 by a transversely extending rod 43 communicating between them and extending through an elongated opening 44 in the side of pallet support 35. FIG. 1 shows air cylinder 40 attached to the adjacent member of the pair of pallet supports 35 but it could be attached to either one and, therefore, does not matter.

The means provided for reciprocal movement of mold end member 14 to operative position thereof on the pallet and to inoperative position thereof beyond the end of the pallet is shown in FIG. 4 and includes a car 21, to the forward part or pallet side of which mold end member 14 is permanently attached. The car is provided with wheels 46 for horizontal reciprocal movement thereof along the top of the pallet and along members 47 and 48 which are level at the tops thereof with the top of the pallet 2, the members 47 and 48, as better shown in FIG. 2, being supported by horizontally disposed and oppositely spaced longitudinally extending members 67 and 68, respectively, and by vertical members 69 and 70 attached to 67 and 68, respectively. Transversely extending members 71, 78 and 86 stiffen the frame. Car 21 is also provided with horizontally disposed wheels 49, also shown in FIG. 2, at least two on each side thereof for proper balance, which wheels abut against oppositely spaced vertically disposed longitudinally extending members 50 and 51 positioned on top of members 47 and 48, respectively, permanently attached thereto and in end-alignment therewith and coplanar at the oppositely facing sides thereof with *the lower portions of* oppositely spaced vertically disposed longitudinally extending stationary side members 52 and 53 also positioned on top of members 47 and 48, respectively, permanently attached thereto but being higher than members 50 and 51 and of the same height as members 12 and 13 which comprise the mold side members, as aforementioned. Stationary side members 52 and 53 [being] *are* in end-alignment and coplanar at the oppositely facing sides thereof with mold side members 12 and 13, when the mold side members are in operative positions thereof, thereby providing continuous surfaces upon which wheels 49 may travel to keep car 21 in alignment during its reciprocal movements from an operative position wherein the front end thereof is positioned on top of the pallet and the rear end thereof is positioned outwardly from the end of the pallet[,] to an inoperative position wherein the entire car is positioned outwardly from the end of the pallet. In the movements of car 21[,] wheels 49 will also abut against members 64 and 65, which are coplanar at the opposite sides thereof with members 50 and 51, respectively.

Figure 2:
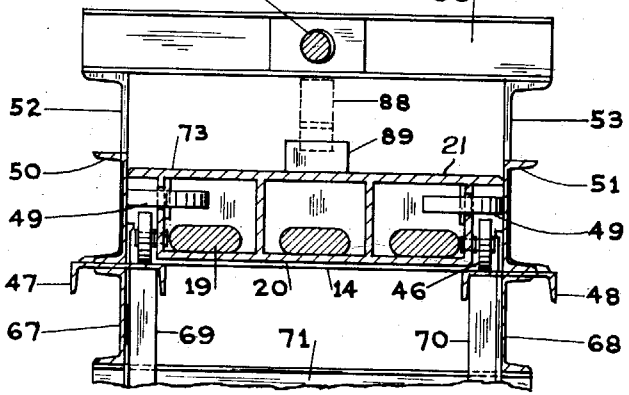
FIG. 2 is a transverse vertical sectional view taken on the line 2—2 of the FIGS. 1 and 4.

The means provided for reciprocal movement of car 21 includes a longitudinally extending horizontally disposed operating screw 54 turnably attached at the forward end thereof, which is the end nearest the pallet, to a horizontally disposed member 55 transversely mounted and attached at the ends thereof to the tops of oppositely facing stationary side members 52 and 53, as shown in FIGS. 2 and 4, and at the rearward end thereof to member 56, which is horizontally disposed and extends transversely between and is vertically supported by *vertical* [disposed] members 57 and 58 mounted on channels 47 and 48, respectively, as shown in FIGS. 1 and 4.

Also, as shown in FIG. 4, a horizontally disposed transversely extending member 59, with filler piece 60 attached thereto, both threaded to register with the threads of operating screw 54, is attached to car 21 by vertical bar 61 and moves horizontally along the operating screw 54 when the latter is turned by reversible motor and reduction gear 62 mounted on top of horizontally disposed transversely extending member 63, positioned higher than member 59 to permit the latter to move thereunder, member 63 being supported at the ends thereof by oppositely spaced vertically disposed members 64 and 65, coplanar at the opposite sides thereto with the opposite sides of members 50, 51, 52 and 53, and attached at the bottom ends thereof to members 47 and 48, respectively. A belt 66 transmits the power of reversible motor and reduction gear 62 to operating screw 54.

Also shown in FIG. 4 is the set of longitudinally extending cores 19, at the right end of the machine, employed when the material depositing mechanism 18 moves from left to right over the mold, its inoperative position at the left being designated by the numeral 18a, as shown in FIG. 1. The right end of the completed slab 72 is shown with the longitudinal cores 19, not yet completely withdrawn from the slab, supported against deflection within the mold by stirrups 11 and beyond the ends of the mold by support 20 attached to car 21. Support 20 is better shown in FIG. 2. Mechanism 18 is already positioned above closely adjacent [cut-off member] *closure plate* 73 located at the top of car 21 and permanently attached thereto, which serves to [cut] *shut* off the flow of concrete from hopper 96 of mechanism 18. The ends of longitudinal cores 19 are attached to a car 74 having a reversible motor and reduction gear 75 mounted thereon to provide power for movement of the car along oppositely facing longitudinally extending horizontally disposed members 76 and 77, level at the tops thereof with the tops of members 47 and 48, respectively, and end-adjacent thereto, upon which members rails 79 are mounted for guiding of wheels 80 on car 74, to one of which wheels a belt 81 from the drive shaft of reversible motor and reduction gear 75 communicates. Wheels 80 will also ride on members 47 and 48, if operating screw 54 and the supports therefor are positioned at a level higher than that shown in the drawings, whereby to permit motor 75 to pass thereunder. 82 is a channel backstop for car 74. Support at the end of the machine for member 76 is provided by vertically disposed member 83 and for member 77 by vertically disposed member 84, members 83 and 84 being transversely joined by member 85, which latter also supports members 76 and 77, and by member 86 at the base of the machine. Members 76 and 77 are similarly supported and joined at the opposite ends thereof, not shown on the drawings.

Material depositing mechanism 18, after traversing the length of the mold, is positioned in inoperative position thereof beyond the end of the pallet over [cut-off member] *closure plate* 73 closely followed by complete withdrawal of longitudinal cores 19 and 87 from the slab and positioning thereof in their inoperative positions beyond the ends of the pallet. Cores 19 and 87 are used alternately and not at the same time. Simultaneously, as shown in FIG. 3, transverse cores 15 are moved to *their* inoperative positions beyond the side of the pallet closely followed by movement of the mold side members 12 and 13 to inoperative positions thereof beyond the sides of the pallet. Then car 21 and another car 21[,] identical thereto and located beyond the opposite end of the mold[,] move to inoperative positions thereof beyond the ends of the pallet. The pallet with an uncured longitudinally and transversely cored slab thereon is then removed from the machine.

A new pallet *and reinforcing cage are* [is] put in position *in the machine, as in the production of the previous slab,* [on horizontal pallet supports 3, 4 and 35, a new reinforcing cage suspended above the pallet while mold end member 14, mold side members 12 and 13, and transverse cores 15 are put in operative position. The reinforcing cage is then released from suspension to be supported on transverse cores 15 and brackets 17] and, with mechanism 18 positioned in *inoperative* [operative] position thereof [,] *beyond the right end of the pallet,* as shown in FIG. 1, *or beyond the right end of the mold, as shown in FIG. 4,* [and at the right end of mechanism 18 in FIG. 4] a new set of longitudinal cores 87, positioned in inoperative position thereof beyond the left end of the pallet and attached to car 132 is pushed through the openings in mold end member 14, at the left on the pallet, through the mold and through the openings in mold end member 14, at the right on the pallet, the power for moving the cores 87 being provided by reversible motor and reduction gear 131 mounted on car 132, as shown at the left in FIG. 1. The longitudinally extending cores are supported against deflection within the mold by stirrups 11 joining lower reinforcing rods 10 of reinforcing cage 8 at intervals along the length thereof, as best shown in FIGS. 3 and 5, and against deflection outside the mold by a horizontally extending support 20, permanently attached to car 21 and positioned below [cut-off member] *closure plate* 73, exactly in the same manner as the cores 19 were supported within the mold and beyond the right end of the mold and of the pallet by support 20 in the production of the previous slab, as shown in FIGS. 2 and 4.

The material depositing mechanism 18 now moves from inoperative position thereof, shown *at the right* in FIG. 1, [and] *or* at the *left* [right end of mechanism 18] in FIG. 4, toward the left and over the mold, the power for its movement, *as in the production of the previous slab,* being provided by reversible motor 90 and reduction gear 91 which are supported on a shelf attached to the front side of mechanism 18, reduction gear 91 communicating with wheel 92 on mechanism 18 by means of belt 93, as shown in FIG. 1.

FIG. 5 shows mechanism 18 in its movement from right to left over the mold, as indicated by the arrow. Agitator blades 94 mounted on shaft 95 positioned transversely through hopper 96 and revolving counterclockwise, as shown by the arrow, move the somewhat dry mix of concrete 97 from the hopper into the mold, the flow and distribution of the concrete into the mold being aided by vibrators 98 transversely mounted at front and rear within the hopper by means of brackets 99, and positioned somewhat above the level of the finished slab. The concrete is tamped into the mold by front and rear piston tampers 100 and 101, respectively, each provided with a shoe stepped at the underside thereof for better tamping, the front tamper being shown at the top of its stroke and the rear tamper at the bottom of its stroke slightly above the top of the finished slab. As shown in FIGS. 1, 3, 4 and 5, portions of the sides of the material depositing mechanism are cut away, the openings 137 thus provided permitting the ends of the tamper shoe to slide against the mold side members, whereby to tamp the material across the full width of the mold. Each tamper is housed in a rectangular cylinder, is connected to a piston rod 102 which is connected to a connecting rod 103 at pin joint 104, the connecting rod 103 being attached at the upper end thereof to strap 105 mounted on eccentric cam 106 which, in turn, is mounted on drive shaft 107 for the front tamper and on drive shaft 108 for the rear tamper. The power for driving the shafts 107 and 108 is provided by motors and reduction gears 109 and 110, respectively, and transmitted by means of belts 111 and 112, respectively.

As the mechanism 18 proceeds slowly from right to left over the mold, it is seen that rollers 113 and 114 at the front end of the mechanism do not come in contact with the concrete and are, therefore, inoperative. However, it is seen that tamper 100 is supplied with concrete to push into the mold. Concrete also falls into the mold from the bottom of the hopper. Tamper 101 pushes the concrete into the mold followed by trowel 116 set slightly lower than the tamper at the bottom of its stroke and then followed by two rollers, roller 117 set lower than trowel 116 and roller 118 set lower than the roller 117, setting the concrete of the slab down to its final level, which is also the level of the tops of the mold end members 14 and of the adjacent [cut-off members] *closure plates* 73. The agitating, vibrating, tamping, troweling and rolling of the concrete into the mold will be adequate to produce a slab with one pass of the mechanism thereover. In the reverse movement, from left to right, of the mechanism over the mold in the production of the next slab, trowel 115 and rollers 114 and 113 will become operative and perform the functions of trowel 116 and rollers 117 and 118 in the right to left movement of the mechanism 18, and trowel 116 and rollers 117 and 118 will become inoperative.

The right end of FIG. 5 shows longitudinal cores 87 partly withdrawn from molded slab 72, exposing longitudinal corings 120 molded thereby, the longitudinally extending cores 87, in the very same manner as corresponding cores 19, [beginning to be] *being* withdrawn [after] *as* the mechanism 18 [has passed over and filled part of] *fills* the mold, [the withdrawal then proceeding at substantially the same rate of speed as the mechanism 18] *the free ends of the cores following behind the filling of the mold.* The mechanism continues until it has passed over the entire length of the mold and is positioned in inoperative position thereof beyond the end of the *mold and of the* pallet over a [cut-off member] *closure plate* 73 provided therefor on a car identical to car 21 but positioned beyond the left end of the mold and of the pallet, followed shortly after by removal of longitudinal cores 87 from the mold and the slab and movement thereof to their inoperative positions beyond the left end *of the mold and of* the pallet simultaneously with the movement to their inoperative positions of transverse cores 15. Mold side members 12 and 13 and mold end members 14 are then moved to their inoperative positions to permit removal from the machine of the pallet with a newly molded uncured *transversely and longitudinally* cored concrete slab thereon. The ends of the longitudinal cores 87, and of the cores 19, in the reverse movement of the mechanism 18, are not far from the rear of the mechanism, being withdrawn from the slab as it is made inch by inch by the movement of mechanism 18 over the mold, [and move at substantially the same rate of speed, as aforementioned,] thereby saving time because the entire length of the cores 87 and 19 are not withdrawn after the entire slab is completed but rather while the slab is being molded, thereby also saving the power that would be required to withdraw the entire core from the slab, eliminating the need for tapering the core and saving wear on the core [,] except for a small portion at the end thereof caused by abrasion against the concrete when being drawn through fully compacted concrete in the finished slab and, most importantly of all, preventing rupture of the unset concrete during withdrawal of the cores. It would not otherwise be possible to mold longitudinal corings of the same vertical section throughout their length wherein stirrups are employed in the slab.

Figure 6:
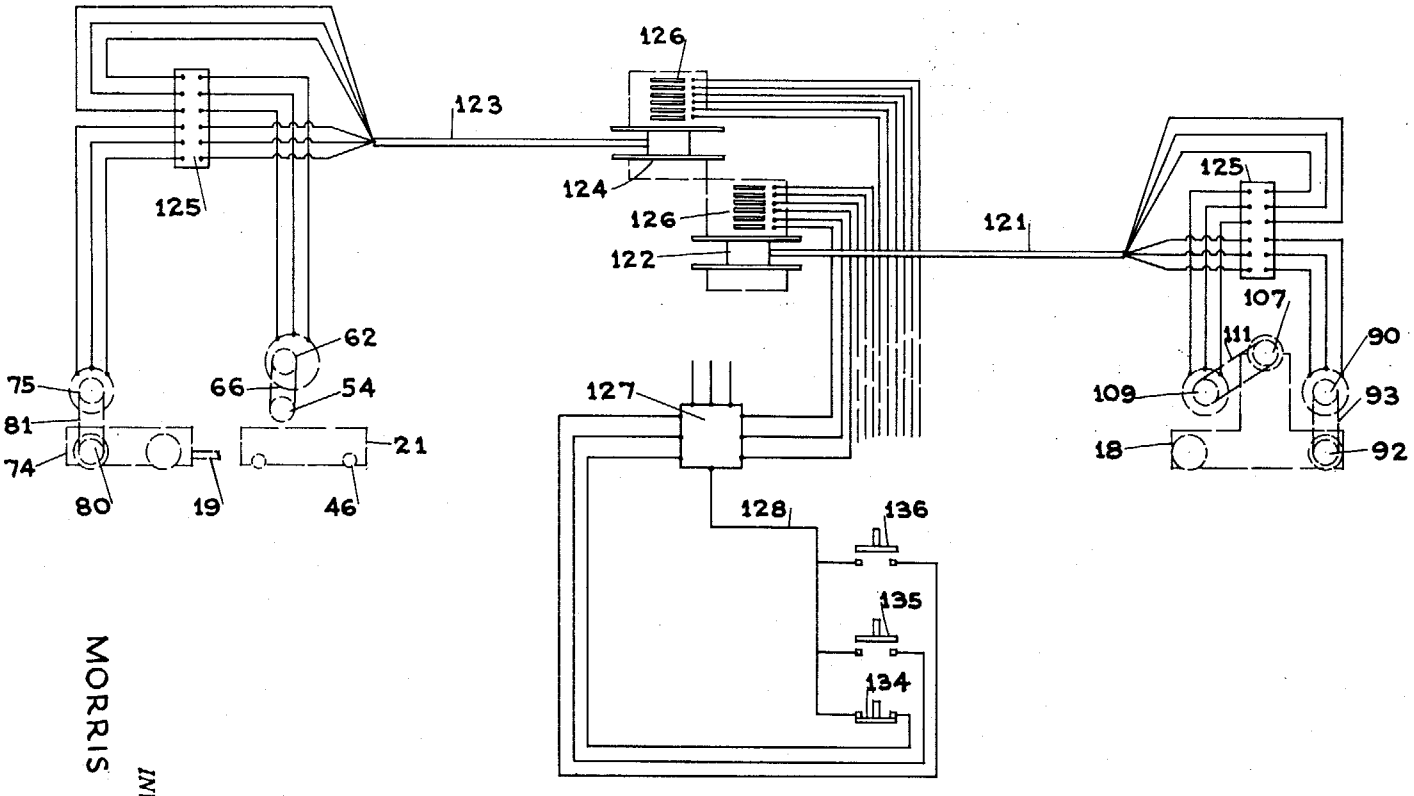
[FIG. 6 is a diagrammatic layout of the wiring circuits and controls for several of the mechanisms embodying the invention.]

[FIG. 6 is a diagrammatic representation of the electric controls. In mechanism 18 the diagram for one and not both of the piston tampers is shown because they are identical and are made operative when over the mold and inoperative when not over the mold. The motor chosen is 109 operating drive shaft 107. The other motor is reversible motor 90 which operates wheel 92 through reduction gear 91, not shown, by means of belt 93. The three wires leading to each of the motors 109 and 90 on mechanism 18 are joined in a cable 121 which is wound and unwound from a reel 122 during the reciprocating movements of mechanism 18. Similarly, the three wires to the reversible motor and reduction gear 62, which drive operating screw 54 and control the forward and backward movements of car 21, and to the reversible motor and gear 75, which control the movements of car 74, are in a cable 123 wound and unwound from a reel 124. The usual connecting boxes 125 and 126 may be used for the connections of the wires. Each of the three wires for each of the motors is connected according to usual practice with a relay 127 and said three wires are all connected with a return wire 128 to the relay, independently of each other and with interposed switches 134, 135 and 136. When switch 129 is closed, the motor controlled by the three wire circuit to which it is attached is at rest. Switches 135 and 136 are reversing switches, the motor running in one direction when one is closed and in the opposite direction when the other is closed.

Mechanism 18 has four motors, 109 and 110 for each of the two tampers 100 and 101, which need not be reversible, a reversible motor for agitator drive shaft 95, not shown on any of the drawings, and a reversible motor 90 for moving mechanism 18. There is a reversible motor 62 for turning operating screw 54 at the right end of the machine and another and identical motor 129 at the left end of the machine for turning an identical operating screw 130 adjacent thereto. There is a reversible motor 75 at the right end of the machine for moving car 74 adjacent thereto and another and identical motor 131 at the left end of the machine for moving car 132, identical to car 74. The total number of motors is eight, and there will be three duplicates of the diagram shown for each of the motors. There will also be six air cylinders, for which an electrical diagram is not shown, two for moving member 16 with transverse cores 15 thereon, two for moving mold side member 12 and two for moving mold side member 13. Electricity is also provided for the two vibrators 98. As electrical controls of the type illustrated and mentioned above are not new and do not form a novel structural part of the invention, though used in its operation, it is not more specifically detailed as those skilled in the art are familiar with such controls and may readily produce them.]

I claim:

1. In a machine of the type described for molding concrete slabs or the like, an open-topped mold having a horizontal mold bottom pallet and oppositely spaced mold end members movable to operative positions thereof on top of the pallet and to inoperative positions thereof beyond the ends of the pallet, each of the mold end members provided with a horizontally located [cut-off member] *closure plate* permanently attached thereto level at the top thereof with the top of the mold end member, coplanar at the side edges thereof with the side edges of the mold end member and extending in a direction away from the other of the mold end members, the mold also having oppositely spaced mold side members, each as long as the pallet, movable to operative positions thereof adjacent the side edges of the mold end members and the side edges of the *closure plates,* [cut-off members] in operative positions of the mold end members, and to inoperative positions thereof beyond the sides of the pallet, the mold side members, in operative positions thereof, extending from one end of the pallet to the other, means for moving the mold end members and other means for moving the mold side members to said operative and inoperative positions thereof, an open-bottomed cementitious material depositing mechanism adapted for operative movement thereof in either direction lengthwise over the open top of the mold and to be moved to inoperative positions thereof over either of the *closure plates,* [cut-off members] oppositely spaced longitudinally extending stationary side members positioned beyond each end of the pallet on supporting means provided therefor and permanently attached thereto, the tops of the mold side members and stationary side members being above the level of the tops of the mold end members, the mold side members and stationary side members being end-adjacent one another and coplanar at the inside faces thereof in operative positions of the mold side members, the sides of the material depositing mechanism extending downward to a level closely adjacent the level of the tops of the mold end members and the tops of the *closure plates,* [cut-off members] the material depositing mechanism having a width such as to extend transversely from one mold side member to the other, in operative positions of the mold side members, and from one stationary side member to the other, the sides of the mechanism being closely adjacent the inside faces of the mold side members, in operative positions thereof, and the inside faces of the stationary side members, in said movements of the mechanism the sides thereof sliding against the inside faces of the mold side members, in operative positions thereof, and against the inside faces of the stationary side members.

2. In apparatus of the class described, an elongated mold including a horizontal mold bottom pallet, movable mold end members and movable mold side members, means for moving the mold end members to operative positions thereof on top of the pallet and to inoperative positions thereof beyond the ends of the pallet, means for moving the mold side members to operative positions thereof adjacent the side edges of the mold end members, in operative positions of the latter, and to inoperative positions thereof beyond the sides of the pallet, the mold side members being as long as the pallet and, in operative positions thereof, extending from one end of the pallet to the other, the tops of the mold side members being at a level above the level of the tops of the mold end members, oppositely spaced stationary side members located beyond each end of the pallet, the stationary side members being level at the tops thereof with the tops of the mold side members and end-adjacent to and in alignment with the mold side members, in operative positions of the latter, supporting means for the stationary side members, material depositing means adapted for operative movement thereof in either direction lengthwise over the mold side members, when the latter are in their operative positions, and for movement to inoperative positions thereof over *closure plates* [cut-off members] positioned beyond the ends of the mold and beyond the ends of the pallet and over the stationary side members, means for driving the material depositing mechanism in said movements thereof, the material depositing means, in said movements thereof, bearing against the upper edges of the mold side members, when the latter are in their operative positions, and against the upper edges of the stationary side members.

3. In a machine of the type described for molding longitudinally cored concrete slabs or the like to be removed from the machine in an uncured condition, an elongated mold having a removable horizontally located mold bottom pallet, movable mold end members and movable mold side members, means for moving the mold end members to operative positions thereof on top of the pallet and to inoperative positions thereof beyond the ends of the pallet, means for moving the mold side members to operative positions thereof adjacent the side edges of the mold end members, in operative positions of the latter, and to inoperative positions thereof beyond the sides of the pallet, a plurality of openings extending horizontally through one of the mold end members and corresponding oppositely spaced openings extending horizontally through the other of the mold end members, a set of longitudinally extending cores, adapted to register with the openings in both mold end members, positioned in inoperative position thereof beyond one end of the pallet, the set of cores having a length such as to extend, in operative position thereof, through the length of the mold and through the openings in the mold end members, another and identical set of longitudinally extending cores positioned in inoperative position thereof beyond the other end of the pallet and adapted to move correspondingly to operative position thereof through the length of the mold and through the openings in both of the mold end members, supporting means for the sets of cores in operative and inoperative positions thereof, means for alternately moving the sets of cores to said operative and inoperative positions thereof, means for operating the moving means for the cores to selectively locate the sets of cores in either of said positions thereof, a cementitious material depositing mechanism adapted for operative movement thereof lengthwise over the mold in a direction opposite the direction of movement to operative position thereof of one of the sets of cores [,] to fill the mold in a single pass thereover in the production of one uncured longitudinally cored concrete slab or the like on said removable mold bottom pallet and for operative movement thereof lengthwise over the mold in a direction opposite the direction of movement to operative position thereof of the other set of cores [,] to fill the mold in another single pass thereover in the production of the next uncured longitudinally cored concrete slab or the like on another removable mold bottom pallet, means for removing from the machine the mold bottom pallet with the newly molded product thereon and for returning to the machine another mold bottom pallet, the mechanism adapted for movement to inoperative positions thereof over *closure plates* [cut-off members] located beyond the ends of the mold and beyond the ends of the pallet, means for driving the mechanism in said movements thereof, the operative sets of cores adapted to [begin their] return to said inoperative positions thereof *as* [after] the mechanism [has filled part of] *fills* the mold [and to move to said inoperative positions thereof at substantially the same rate of speed as that employed in the operative movements of the mechanism.] *, the free ends of the cores following behind the filling of the mold.*

4. In a machine of the type described for molding longitudinally cored concrete slabs or the like to be removed from the machine in an uncured condition, an elongated mold having a removable horizontal mold bottom pallet, movable mold end members and movable mold side members, means for moving the mold end members to operative positions on top of the pallet and to inoperative positions beyond the ends of the pallet, means for moving the mold side members to operative positions thereof adjacent the side edges of the mold end members, in operative positions of the latter, and to inoperative positions thereof beyond the sides of the pallet, an opening extending horizontally through one of the mold end members and a corresponding [,] oppositely spaced opening extending horizontally through the other of the mold end members, a longitudinally extending core, adapted to register with the openings in both mold end members, positioned in inoperative position thereof beyond one end of the pallet, the core having a length such as to extend, in operative position thereof, through the length of the mold and through the openings in the mold end members, another and identical core positioned in inoperative position thereof beyond the other end of the pallet and adapted to move correspondingly to operative position thereof through the length of the mold and through the openings in the mold end members, supporting means for the cores in operative and inoperative positions thereof, means for alternately moving the cores to said operative and inoperative positions thereof, means for operating the moving means for the cores to selectively locate the cores in either of said positions thereof, a cementitious material depositing mechanism adapted for operative movement thereof lengthwise over the mold in a direction opposite the direction of movement to operative position thereof of *one* [a single] of the cores, to fill the mold in *a single* [one] pass thereover in the production of one uncured longitudinally cored concrete slab or the like on said removable mold bottom pallet [,] and for operative movement thereof lengthwise over the mold in a direction opposite the direction of movement to operative position thereof of the other of the cores [,] to fill the mold in another single pass thereover in the production of the next uncured longitudinally cored concrete slab or the like on another removable mold bottom pallet, means for removing from the machine the mold bottom pallet with the newly molded product thereon and for returning to the machine another mold bottom pallet, the mechanism adapted for movement to inoperative positions thereof over *closure plates* [cut-off members] located beyond the ends of the mold and beyond the ends of the pallet, means for driving the mechanism in said movements thereof, the operative [cores] *core* adapted to [begin their] return to said inoperative [positions] *position* thereof [after] *as* the mechanism [has filled part of] *fills* the mold, [and to move to said inoperative positions thereof at substantially the same rate of speed as that employed in the operative movements of the mechanism.] *the free end of the core following behind the filling of the mold.*

5. In a machine of the type described for molding slabs, beams, columns or the like, a mold having a horizontal mold bottom pallet, oppositely spaced mold end members movable to operative positions thereof on top of the pallet and to inoperative positions thereof beyond the ends of the pallet, oppositely spaced mold side members movable to operative positions thereof adjacent the side edges of the mold end members, in operative positions of the latter, and to inoperative positions thereof beyond the sides of the pallet, the mold side members being each as long as the pallet and, in operative positions thereof, extending from one end of the pallet to the other, means for moving the mold end members and other means for moving the mold side members to said operative and inoperative positions thereof, a material depositing mechanism adapted for operative movement thereof in either direction lengthwise over the mold and for movement to inoperative *positions* [position] thereof over *closure plates* [cut-off members] positioned beyond the ends of the mold and beyond the ends of the pallet [,] *level with the tops of and* attached to the mold end members, oppositely spaced longitudinally extending stationary side members positioned beyond each end of the pallet on supporting means provided therefor, the tops of the mold side members and of the stationary side members being above the tops of the mold end members, in operative positions of the mold side members the ends thereof being adjacent the ends of the stationary side members and the inside faces thereof being coplanar with the inside faces of the stationary side members, the sides of the material depositing mechanism extending downward below the tops of the mold side members [,] *to a level closely adjacent the level of the tops of the mold end members and of the closure plates,* the material depositing mechanism having a width such as to extend transversely from one mold side member to the other, in operative positions of the latter, and from one stationary side member to the other, *in said movements thereof* the sides of the mechanism being slidable against the inside faces of the mold side members, when the latter are in their operative positions, and against the inside faces of the stationary side members.

6. In apparatus of the class described, an elongated mold including a horizontal mold bottom pallet, movable mold end members and movable mold side members, means for moving the mold end members to operative positions thereof on top of the pallet and to inoperative positions thereof beyond the ends of the *pallet*, [pallets] means for moving the mold side members to operative positions thereof adjacent the side edges of the mold end members, in operative positions of the latter, and to inoperative positions thereof beyond the sides of the pallet, the mold side members being as long as the pallet and, in operative positions thereof, extending from one end of the pallet to the other, oppositely spaced longitudinally extending stationary side members located beyond each end of the pallet, supporting means for the stationary side members, the stationary side members being end-adjacent to and in alignment with the mold side members, in operative positions of the latter, and level at the upper edges thereof with the upper edges of the mold side members, material depositing means adapted for operative movement thereof in either direction lengthwise over the mold side members, when the latter are in their operative positions, and for movement to inoperative positions thereof [beyond the ends of the mold and] beyond the ends of the pallet over *the stationary side members there located*, [cut-off members there located,] means for driving the material depositing means in said movements thereof, in said movements thereof the material depositing means bearing against the upper edges of the mold side members and against the upper edges of the stationary side members.

7. In a machine of the type described for molding longitudinal cored concrete slabs, beams, columns or the like to be removed from the machine in an uncured condition, an elongated mold having a removable horizontally located mold bottom pallet, movable mold end members and movable mold side members means for moving the mold end members to operative positions thereof on top of the pallet and to inoperative positions thereof beyond the ends of the pallet, means for moving the mold side members to operative positions thereof adjacent the side edges of the mold end members, in operative positions of the latter, and to inoperative positions thereof beyond the sides of the pallet, a plurality of openings extending horizontally through one of the mold end members and corresponding oppositely spaced openings extending through the other of the mold end members, a set of longitudinally extending cores, adapted to register with the openings in both [the] mold end members, positioned in inoperative position thereof beyond one end of the pallet and another set of longitudinally extending cores, *also* adapted to register with the openings in both mold end members, positioned in inoperative position thereof beyond the other end of the pallet, each of the two sets of cores having a length such as to extend, in operative position thereof, through the length of the mold and through the openings in the mold end members, [supporting means for the sets of cores in operative and inoperative positions thereof,] means for alternately moving the sets of cores to said operative and inoperative positions thereof, a cementitious material depositing mechanism adapted for operative movement thereof lengthwise over the mold in a direction opposite the direction of movement to operative position thereof of one of the sets of cores [,] to fill the mold in a single pass thereover in the production of one uncured longitudinally cored concrete slab, beam, column or the like on said removable mold bottom pallet [,] and for operative movement thereof lengthwise over the mold in a direction opposite the direction of movement to operative position thereof of the other set of cores [,] to fill the mold in another single pass thereover in the production of the next uncured longitudinally cored concrete slab, beam, column or the like on another removable mold bottom pallet, means for removing from the machine the mold bottom pallet with the newly molded product thereon and for returning to the machine another mold bottom pallet to receive the next newly molded product thereon, the mechanism adapted for movement to inoperative positions thereof beyond the ends of the mold and the pallet, means for cutting off the flow of cementitious material from the mechanism in said inoperative positions thereof, means for driving the mechanism in said movements thereof, each set of cores adapted to [begin its] return from operative to inoperative position thereof [after] *as* the mechanism [has filled part of] *fills* the mold, [and to move to said inoperative position thereof at substantially the same rate of speed as that employed in the operative movement of the mechanism.] *the free ends of the cores following behind the filling of the mold.*

8. In a machine of the type described for molding longitudinally cored concrete slabs, beams, columns or the like to be removed from the machine in a uncured condition, an elongated mold having a removable horizontally located mold bottom pallet, movable mold end members and movable mold side members, means for moving the mold end members to operative positions thereof on top of the pallet and to inoperative positions thereof beyond the ends of the pallet, means for moving the mold side members to operative positions thereof adjacent the sides edges of the mold end members, in operative positions of the latter, and to inoperative positions thereof beyond the sides of the pallet, an opening extending horizontally through one of the mold end members and a corresponding oppositely spaced opening extending horizontally through the other of the mold end members, an identical longitudinally extending core positioned in inoperative position thereof beyond *each* [one] end of the pallet and adapted to register with the openings, each of the cores having a length such as to extend, in operative position thereof, through the length of the mold and through the openings in the mold end members, [supporting means for the cores in operative and inoperative positions thereof,] means for alternately moving the cores to said operative and inoperative positions thereof, a cementitious material depositing mechanism adapted for operative movement thereof lengthwise over the mold in a direction opposite the direction of movement to operative position thereof of one of the cores [,] to fill the mold in a single pass thereover in the production of one uncured longitudinally cored concrete slab, beam, column or the like on said removable mold bottom pallet [,] and for operative movement thereof lengthwise over the mold in a direction opposite the direction of movement to operative position thereof of the other of the cores [,] to fill the mold in another single pass thereover in the production of the next uncured longitudinally cored concrete slab, beam, column or the like on another removable mold bottom pallet, means for removing from the machine the mold bottom pallet with the newly molded product thereon and for returning another mold bottom pallet to the machine to receive the next newly molded product thereon, the mechanism adapted for movement to inoperative positions thereof beyond the ends of the mold and the pallet, means for cutting off the flow of cementitious material from the mechanism in said inoperative positions thereof, means for driving the mechanism in said movements thereof, each core adapted to [begin its] return from operative to inoperative position thereof [after] *as* the mechanism [has filled part of] *fills* the mold, [and to move to said inoperative position thereof at substantially the] [same rate of speed as that employed in the operative movement of the mechanism.] the free end of the core following behind the filling of the mold.

References Cited by the Examiner

The following references, cited by the Examiner, are of record in the patented file of this patent or the original patent.

UNITED STATES PATENTS

| | | | |
|---|---|---|---|
| 915,507 | 3/09 | Wecht | 25—128.1 |
| 2,036,367 | 4/36 | Shinn et al. | 25—103 |
| 2,164,953 | 7/39 | Shaw | 25—41.1 |
| 2,524,683 | 10/50 | Sumpf | 25—41.1 |
| 2,641,819 | 6/53 | Peavy | 25—43 |
| 2,655,708 | 10/53 | Eschenbrenner | 25—41.1 |
| 2,779,080 | 1/57 | Chidester | 25—121 |
| 2,781,570 | 2/57 | Seymour | 25—41.1 |

FOREIGN PATENTS

| | | |
|---|---|---|
| 820,116 | 11/51 | Germany. |

MICHAEL V. BRINDISI, *Primary Examiner.*

NEDWIN BERGER, *Examiner.*